United States Patent
Chiu (10) Patent No.: US 10,229,031 B2
(45) Date of Patent: Mar. 12, 2019

(54) DEBUGGING INLINE FUNCTIONS IN OPTIMIZED CODE

(75) Inventor: Jen-Lung Chiu, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 1418 days.

(21) Appl. No.: 13/183,948

(22) Filed: Jul. 15, 2011

(65) Prior Publication Data

US 2013/0019227 A1   Jan. 17, 2013

(51) Int. Cl.
G06F 9/44 (2018.01)
G06F 11/36 (2006.01)

(52) U.S. Cl.
CPC .................. *G06F 11/3628* (2013.01)

(58) Field of Classification Search
None
See application file for complete search history.

(56) References Cited

U.S. PATENT DOCUMENTS

| | | | | |
|---|---|---|---|---|
| 5,713,010 A * | 1/1998 | Buzbee et al. | | 717/124 |
| 5,794,047 A * | 8/1998 | Meier | | G06F 9/547 |
| | | | | 709/203 |
| 5,812,850 A * | 9/1998 | Wimble | | 717/131 |
| 5,978,587 A * | 11/1999 | Baisley et al. | | 717/144 |
| 6,091,896 A | 7/2000 | Curreri et al. | | |
| 6,105,072 A * | 8/2000 | Fischer | | G06F 9/4428 |
| | | | | 719/315 |
| 6,106,574 A * | 8/2000 | Baisley | | G06F 8/42 |
| | | | | 717/140 |
| 6,223,340 B1 | 4/2001 | Detlefs | | |
| 6,981,250 B1 * | 12/2005 | Wiltamuth | | G06F 9/443 |
| | | | | 707/999.202 |
| 6,993,754 B2 | 1/2006 | Freudenberger et al. | | |
| 7,080,368 B2 * | 7/2006 | Nistler | | G06F 9/449 |
| | | | | 717/153 |
| 7,353,427 B2 | 4/2008 | Bates et al. | | |
| 7,386,686 B2 | 6/2008 | Wu et al. | | |
| 8,312,431 B1 * | 11/2012 | Moffat et al. | | 717/126 |
| 2003/0115581 A1 * | 6/2003 | Fahs et al. | | 717/158 |
| 2003/0204838 A1 * | 10/2003 | Caspole | | G06F 11/362 |
| | | | | 717/130 |
| 2004/0003375 A1 * | 1/2004 | George | | G06F 11/3466 |
| | | | | 717/124 |
| 2004/0088720 A1 * | 5/2004 | Nistler | | G06F 9/443 |
| | | | | 719/332 |
| 2010/0235815 A1 * | 9/2010 | Maybee | | G06F 11/3636 |
| | | | | 717/125 |

OTHER PUBLICATIONS

Hölzle "Debugging Optimized Code with Dynamic Deoptimization", 1992, Proceedings of the ACM SIGPLAN 1992 conference on Programming language design and implementation, pp. 32-43.*

(Continued)

*Primary Examiner* — Jue Louie (57) ABSTRACT

Various embodiments provide an ability to present content associated with an inline function via a code debugging tool. In some embodiments, the code debugging tool can be configured to enable manipulation of commands associated with the inline function. Alternately or additionally, one or more calls to the inline function can be manipulated independently from each other within the debugging tool.

20 Claims, 8 Drawing Sheets

(56) References Cited

OTHER PUBLICATIONS

Oracle, "Oracle Solaris Studio 12.2: Debugging a Program with dbx", Sep. 2010, Part No. 821-1380.*
Chambers et al. "An Efficient Implementation of SELF, a Dynamically-Typed Object-Oriented Language Based on Prototypes", 1989, OOPSLA '89 Proceedings.*
The Cecil Group, "How to Use the Vortex Compiler and Environment", Jun. 2006, retrieved from: http://web.archive.org/web/20060619123900/http://www.cs.washington.edu/research/projects/cecil/www/Release/doc-vortex/vortex.pdf.*
Stallman et al. "Debugging with GDB", Jun. 2010, Chapters 8, 11, retrieved from: http://web.archive.org/web/20100620042325/http://sourceware.org/gdb/current/onlinedocs/gdbint.pdf.gz.*
Nicholas Zakas, "JavaScript for Web Developers", 2009, Wiley Publishing, pp. 502-507.*
HP, "HP Caliper User Guide", Mar. 2010, HP Part No. 5969-7014, Edition 5.2.*
Randolph et al. "Professional Visual Studio 2010", May 2010, Wrox, pp. 66-67.*
"Improving GCC's Inter procedural Optimization Infrastructure", Retrieved at <<http://gcc.gnu.org/projects/tree-profiling.html>>, Retrieved Date: Mar. 4, 2011, pp. 4.
"Breakpoints on inline C/C++function", Retrieved at <<http://infocenter.arm.com/help/index.jsp?topic=/com.arm.doc.faqs/ka3920.html>>, Retrieved Date: Mar. 4, 2011, p. 1.
"Inline Functions", Retrieved at <<http://sourceware.org/gdb/onlinedocs/gdb/Inline-Functions.html>>, Retrieved Date: Mar. 4, 2011, p. 1.

* cited by examiner

Fig. 1

Locals

| Typecast | Locations | | |
|---|---|---|---|
| Name | | Value | |
| i1 | | 0x1e | |
| j1 | | 0x492 | |
| k1 | | <Value unavailable> | |

Calls

| Raw args | Func info | Source Addrs | Headings | Nonvolatile regs | Frame nums | Source args | More | Less |
|---|---|---|---|---|---|---|---|---|
| 00000000 ` 000bf958 | 00007f6 ` f63716cb | | | ADVAPI32!RegCloseKeyStub | | | | |
| (Inline Function) | | | | simple!MoreCalculate+0x69 | | | | |
| (Inline Function) | | | | simple!Calculate+0xa3 | | | | |
| 00000000 ` 000bf960 | 00007f6 ` f6371a41 | | | simple!wmain+103 | | | | |
| 00000000 ` 000bf9d0 | 00007ff ` 6e5635dd | | | simple!__wmainCRTStartup+0x13d | | | | |
| 00000000 ` 000bfa10 | 00000000 ` 7706d531 | | | kernel32!BaseThreadInitThunk+0xd | | | | |
| 00000000 ` 000bfa40 | 00000000 ` 00000000 | | | ntdll!RtlUserThreadStart+0x1d | | | | |

DEBUGGING INLINE FUNCTIONS IN OPTIMIZED CODE

BACKGROUND

Developing code for software today is typically an iterative process. For example, a programmer writes code to realize a software application, compiles and runs the code to test for problems, and then oftentimes rewrites the code to add on functionality and address defects and/or problems discovered during testing. As part of the testing and/or debugging process, the programmer can launch tools to help the programmer to debug the code while it is executing. In some cases, the tools can expose local variables and values associated with a function, set breakpoints in the code to temporarily halt execution, as well as display a call stack trace and enable memory dumps. These features of the tools help the programmer to track variables as their values change, stop code execution at points of interest to examine the state of the code, see a progression of function calls, such as which functions call other functions, and the like.

One deviation from this, however, is an inline function. Inline functions are functions that a compiler expands inline at compile time. When expanding the inline function, the compiler inserts instructions executing the complete body of the function, instead of generating instructions that reference a function pointer to the inline function. Consequently, information pertaining to the inline function can be lost when it gets expanded, thus translating into a reduced ability to debug around the inline functions. Optimized code can further compound this problem, since the compiler may reorganize instructions to suit selected optimizations and cause the debugging tool and the executing code to be out of synchrony.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide an ability to present content associated with an inline function via a code debugging tool. In some embodiments, the code debugging tool can be configured to enable manipulation of commands associated with the inline function. Alternately or additionally, one or more calls to the inline function can be manipulated independently from each other within the debugging tool.

BRIEF DESCRIPTION OF THE DRAWINGS

The same numbers are used throughout the drawings to reference like features.

DETAILED DESCRIPTION

Overview

Various embodiments provide an ability to present content associated with an inline function via a code debugging tool. In some cases, the code debugging tool can be configured to present content associated with a high level representation of the inline function relative to other function calls. The code debugging tool can be further configured to enable manipulation of commands associated with the inline function. Some embodiments can enable exposure and/or manipulation of local variables associated with the inline function. Alternately or additionally, the code debugging tool can be configured to enable one or more calls to and/or instances of the inline function to be manipulated independently from each other and/or manipulated in groups.

In the discussion that follows, a section entitled "Operating Environment" is provided and describes one environment in which one or more embodiments can be employed. Following this, a section entitled "Debugging Tool Support for Inline Functions" describes a debugging tool environment configured to enable debugging of inline functions. After this, a section entitled "Program Database Support for Inline Functions" describes information associated with inline functions that can be generated and added to program databases. Last, a section entitled "Example System" describes an example system that can be utilized to implement one or more embodiments.

Having provided an overview of various embodiments that are to be described below, consider now an example operating environment in which one or more embodiments can be implemented.

Operating Environment

Figure 1:
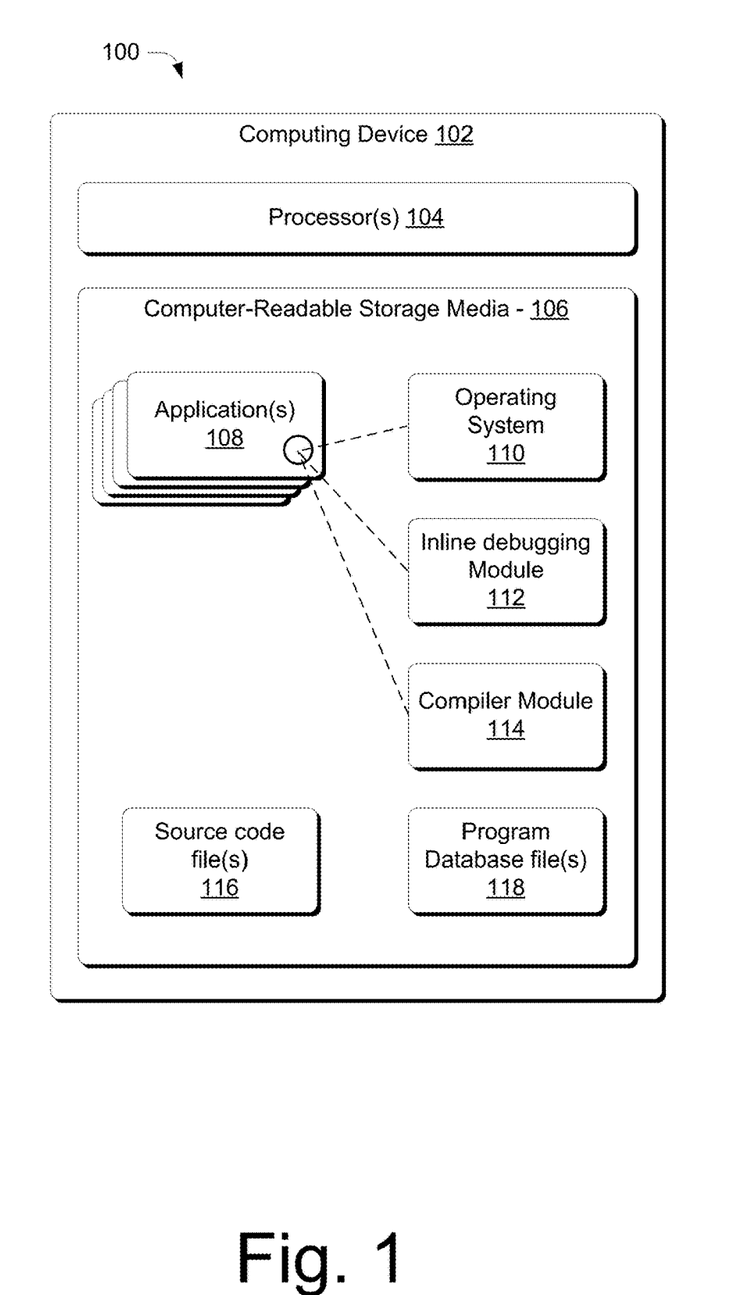
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable storage media 106 and one or more application(s) 108 that reside on the computer-readable storage media and which are executable under the influence of the processor(s). Computing device also include an operating system 110, inline debugging module 112, compiler module 114 and various forms of files, such as source code file(s) 116 and program database file(s) 118. The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 8.

Operating system 110 represents functionality used to manage resources of computing device 102, such as memory allocation, hardware input/output, processor utilization, and other forms of access. Alternately or additionally, operating system 110 can be configured to provide services and/or other features to a user and/or programmer.

Inline debugging module 112 represents functionality configured to enable debugging of one or more inline functions. In some embodiments, inline debugging module 112 can comprise a code debugging application tool. In other embodiments, inline debugging module 112 can be configured as a "plug-in" module that can be added to, interfaced with, and/or built into other applications. While illustrated as a single module, it is to be appreciated and understood that the inline debugging module can be implemented as one module, separate modules, or any combination thereof.

Compiler module 114 represents functionality that receives source code as input and generates executable instructions. For example, compiler module 114 can receive source code file(s) 116 as an input, and generate an executable output, such as application(s) 108. In some embodiments, compiler module 114 generates information about the source code, and/or its associated executable output, and stores the information in separate files, such as program database file(s) 118.

Source code file(s) 116 represents any type of file including computer programming language instructions. In some embodiments, the computer programming language offers an ability to perform inline functions and/or inline expansion. Any suitable programming language can be used, such as C++, C, C#, Ada, Java, and the like.

Program database file(s) 118 represents information that enables generating "debuggable" code, such as code that a code debugging tool can connect to, execute, and/or manipulate. Any sort of information can be included, such as debugging and code project state information. In some embodiments, the code debugging tool can be configured to access and/or process program database file(s) 118 and the information contained within the file(s).

Computing device 102 can be embodied as any suitable computing device such as, by way of example and not limitation, a desktop computer, a portable computer, a handheld computer such as a personal digital assistant (PDA), cell phone, and the like.

Having described an example operating environment, consider now a discussion of inline function support in a code debugging tool that is in accordance with one or more embodiments.

Debugging Tool Support for Inline Functions

When an inline function gets compiled, a compiler expands its associated code "inline". Instead of inserting a reference to the inline function, the compiler places assembly level instructions that execute the body, or composition, of the inline function into a resultant output. After being compiled, instructions executing a function calling the inline function contain the assembly level instructions inline, as opposed to calling a reference to the inline function. As a consequence, debugging code around or associated with inline functions can cause frustration for a programmer. For example, a call stack trace displayed by a code debugging tool may be incomplete and/or not properly identify an inline function. Similarly, the programmer may not have the same visibility and/or access into the inline function as given for other functions, such as an ability to step through the code execution steps or view the inline function's associated local variables and values. This can limit what information can be gleaned by the programmer from the code debugging tool. In some cases, this can also entail causing the programmer to debug assembly level instructions.

Various embodiments provide an ability to present content associated with an inline function via a code debugging tool. The code debugging tool can be configured to connect to and/or execute compiled code in such a way to enable a programmer to halt execution of the code at various points for inspection. In some cases, the code debugging tool can be configured to visually present content associated with a high level representation of the inline function relative to other function calls. One example of a high level representation includes a call stack trace. The call stack trace offers a programmer a view into the currently running functions and/or subroutines. It can store and display the order in which functions are called, who their associated callers are, as well as keep track of the point in which control is passed back to a calling function and identify incoming parameters. In some embodiments, a high level representation of an inline function can be inserted into the call stack trace, such as a virtual frame, name, signature, or identifier associated with the inline function. A virtual frame is a function frame associated with an inline function that shares the same frame context as a function frame of a calling function of the inline function. Alternately or additionally, the high level representation is at level higher than assembly level instructions.

Figure 2:
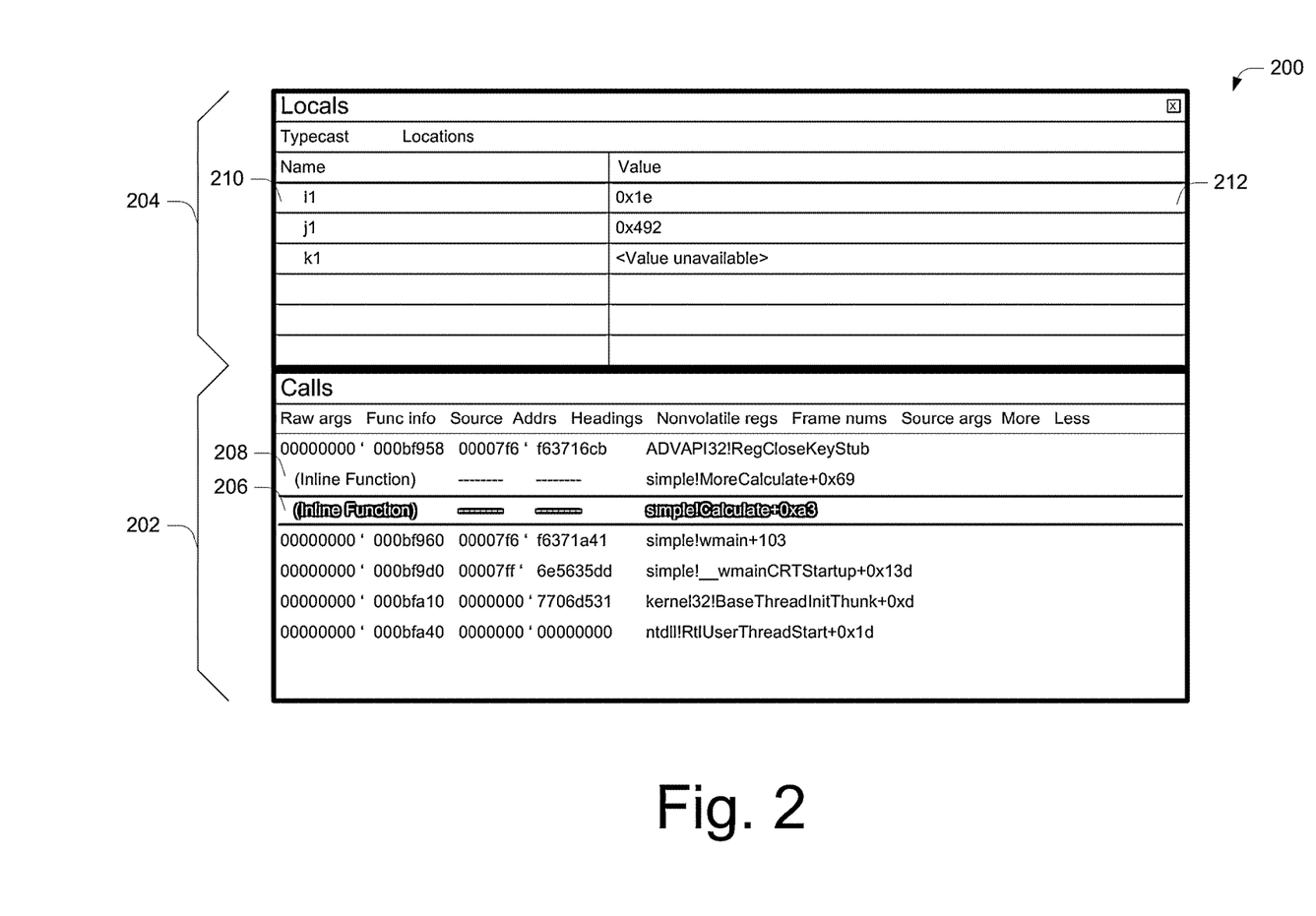
FIG. 2 illustrates aspects of a code debugging tool in accordance with one or more embodiments.

As an example, consider FIG. 2, which illustrates aspects of a code debugging tool in accordance with one or more embodiments. The code debugging tool can be configured to display a window, shown generally here as window 200. The window can be configured to display various forms of debugging information associated with a currently running application and/or executable. In this particular example, window 200 includes region 202 for displaying stack trace information and region 204 for displaying local variables of an associated function call. Alternately or additionally, the running application can be optimized code, where the code has been compiled in such a way to fit certain requirements, such as minimal memory space, fastest execution time, platform independent executable code, platform dependent executable code, and the like.

Region 202 includes call stack trace information associated with code that is currently running. As functions are called, their associated identifiers are pushed onto the call stack trace and/or tracked by an associated debugging call stack. Any suitable information can be captured and/or presented, such as function signatures, addresses of where the function resides in memory, associated incoming arguments and/or parameters, frame pointers and/or identifiers, instruction pointers, and the like. In region 202, "Ntdll!RtlUserThread" is shown as being at the bottom of the call stack, followed by "kernel32!BaseThreadInitThunk". In this context, "Ntdll!RtlUserThread" is the caller of "kernel32!BaseThreadInitThunk".

Also illustrated in region 202 are inline functions 206 and 208: simple!Calculate and simple!MoreCalculate, respectively. In some embodiments, the code debugging tool can be configured to display each inline function in a representation that is unified with other functions, such as in a high level context and/or representation. Here, inline function 206 and 208 are each designated in the call stack trace with an "Inline Function" identifier, as well as their associated function names. Additionally, region 202 displays inline functions 206 and 208 in their calling context, meaning which functions are calling them. This continuity enables a programmer to view different function types in the same manner, thus unifying the debugging experience. Alternately or additionally, inline functions 206 and 208 can be configured to be selectable, as further described below.

In some embodiments, a user can select an inline function displayed in a call stack trace. This can be done in any suitable way, such as through a double-click on the inline function, through a menu selection, through a check-box, and the like. Here, inline function 206 is illustrated as being selected, which is further emphasized by its being highlighted. In some embodiments, selecting the inline function can cause display of additional information associated with the inline function. In this example, the additional information is displayed in adjacent region 204. Alternately or additionally, a separate and/or independent window can be configured to "pop up" for display upon selection of the inline function.

As noted, region 204 displays information associated with selected inline function 206. In this particular example, region 204 displays local variables associated with inline function 206, such as local variable 210. It is to be appreciated and understood, however, that any associated information can be displayed without departing from the spirit of the claimed subject matter. From region 204, a programmer can discern that local variable 210 has a name of "i1", and a value of "0x1e". In some embodiments, the value of local variable 210 can be manually changed. For example, region 212 can be selected and updated with a new value which, in turn, can cause an update to associated code and/or memory space. Alternately or additionally, the code debugging tool can be configured to display multiple callers of an inline function.

Figure 3:
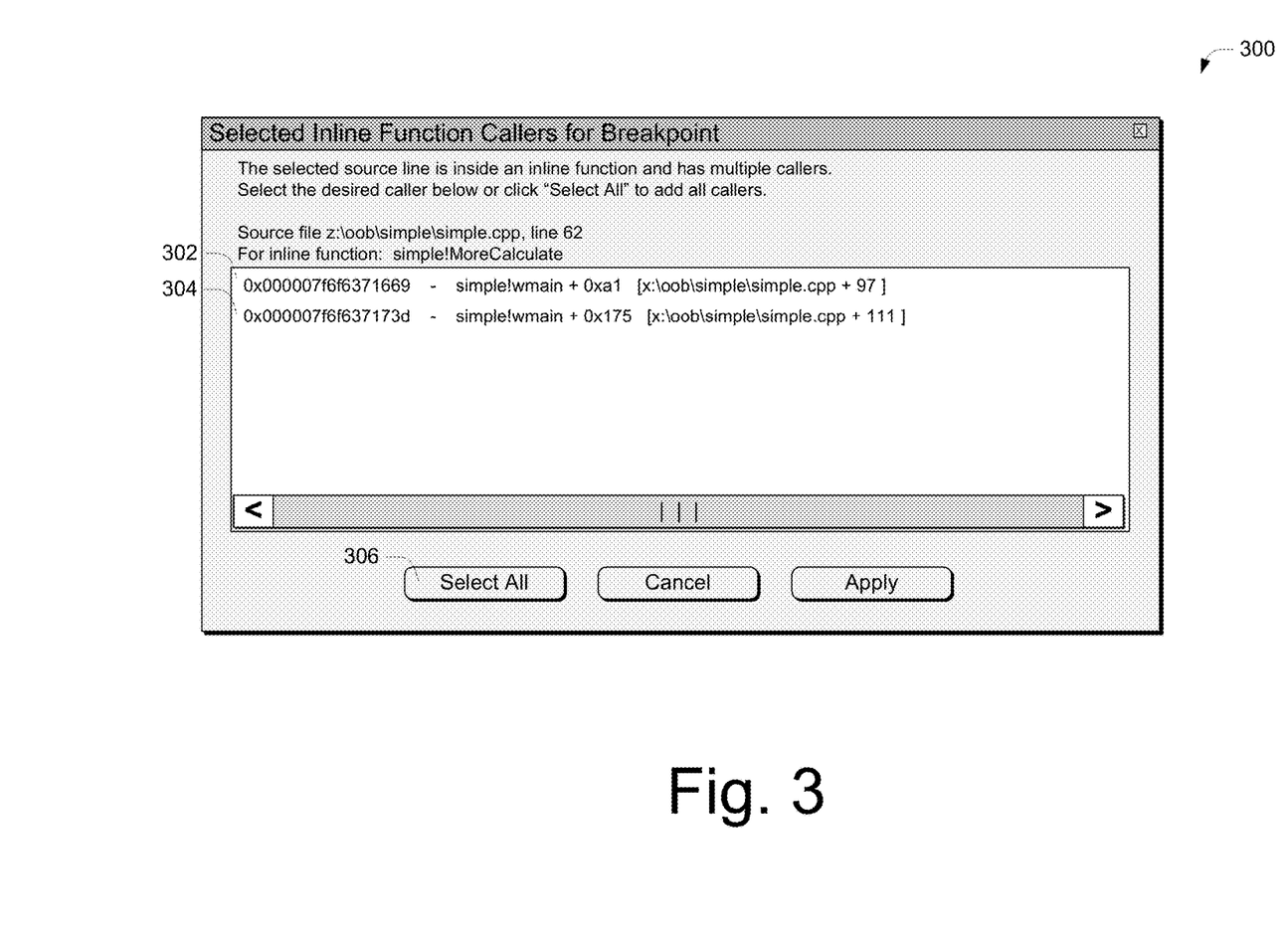
FIG. 3 illustrates aspects of a code debugging tool in accordance with one or more embodiments.

As an example, consider FIG. 3, which illustrates aspects of a code debugging tool in accordance with one or more embodiments. In some embodiments, the code debugging tool can be configured to enumerate and/or identify multiple or all callers of an associated inline function. For instance, the code debugging tool can be configured to extract debugging information from an associated program database file (PDB) and enumerate of all callers of the inline function, as further described below. A user can identify an inline function which they desire to inspect, such as through selecting the inline function from a list. Upon identifying and/or enumerating callers of an associated inline function, window 300 displays a list of the identified callers. In this particular example, two callers are identified, illustrated by entries 302 and 302. Entry 302 indicates a first caller of the inline function at simple.cpp, line 97, while entry 304 indicates a second caller of the inline function at simple.cpp, line 111. Each entry can be configured as selectable, and further configured to enable execution of the code to be halted at specific points, such as through one or more breakpoints, as further described below In some embodiments, the code debugging tool can be configured to enable a user to collectively select and manipulate one or more callers of an inline function. Selection of button 306, entitled "Select All", selects all callers of the associated inline function. In this example, clicking button 306 selects entries 302 and 304 and sets a breakpoint on each instance. Alternately or additionally, individual entries can be selected, examples of which are provided above. In some embodiments, selecting an entry can automatically set a breakpoint in the associated code point. Selecting an entry can also cause an additional window to "pop-up" to allow for alternate and/or additional manipulation of the breakpoint(s). Manipulation of breakpoints of an inline function can include enabling and disabling breakpoints at these points in the code, applying and/or changing a breakpoint condition, changing and/or adding a command to a breakpoint, and the like.

Figure 4:
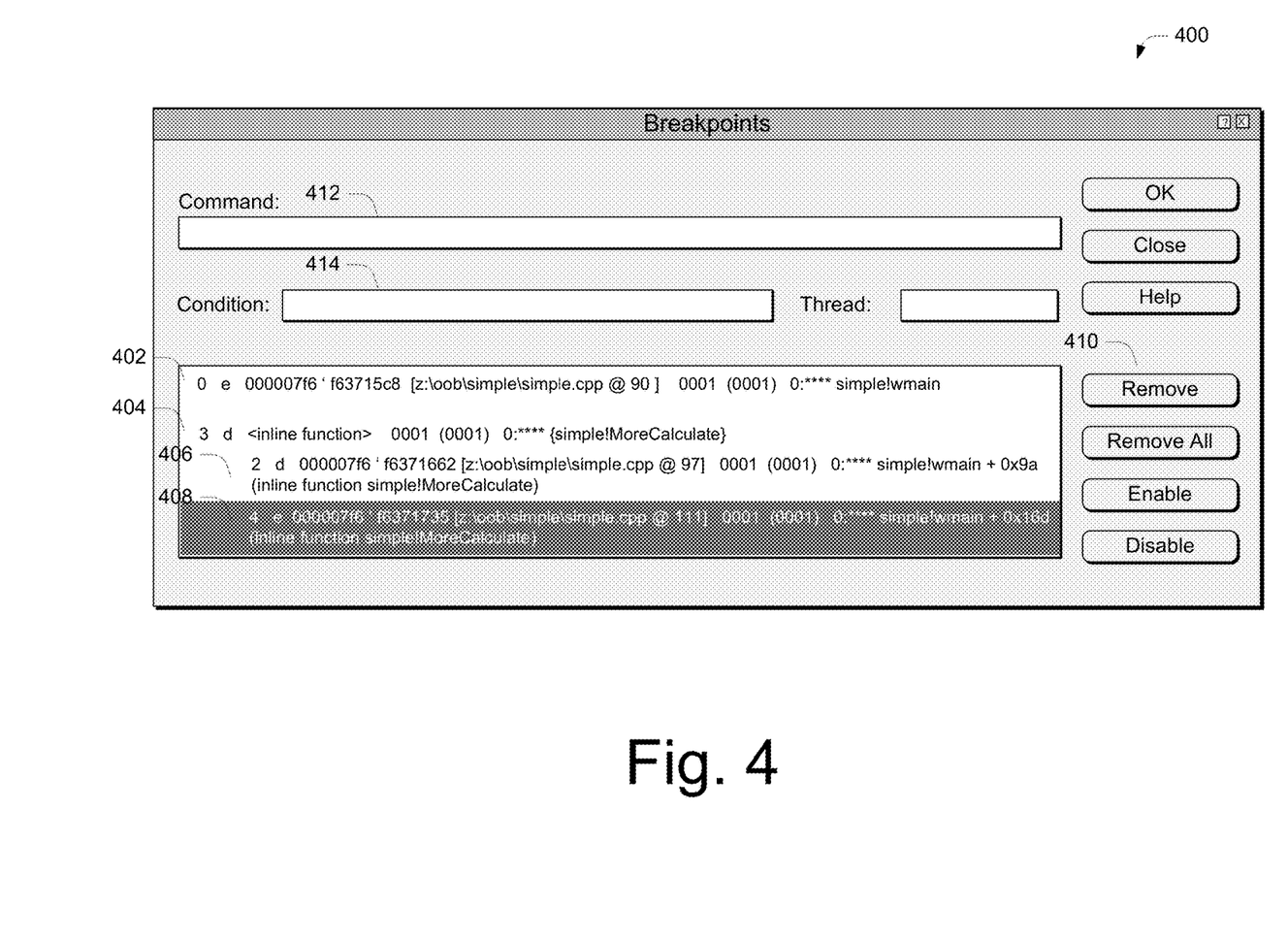
FIG. 4 illustrates aspects of a code debugging tool in accordance with one or more embodiments.

As an example, consider FIG. 4, which illustrates aspects of a code debugging tool in accordance with one or more embodiments, which are shown generally here as window 400. Among other things, window 400 lists breakpoints set in a code debugging tool for a particular application. One such example is entry 402, which illustrates a single breakpoint for function simple!wmain. In addition to listing single breakpoints, window 400 can be configured to list grouping of breakpoints. In this example, entry 404 pertains to a grouping of breakpoints associated with inline function simple!MoreCalculate. While entry 404 identifies the associated inline function, entries 406 and 408 refer to particular instances and/or expansions of the inline function. Entry 406 correlates with a call to the inline function at simple.cpp, line 97, while entry 408 corresponds with a call to the inline function at simple.cpp, line 111.

Various embodiments enable breakpoints to be manipulated independently or as a group. Entries can be individually selected through any suitable means, examples of which are provided above. In some embodiments, an indication of selection can be displayed, such as by highlighting the entry, by displaying an icon next to the entry, displaying a check in a checkbox, and the like. In this particular example, entry 408 is illustrated as being selected through its being highlighted. When selected, the breakpoint associated with entry 408 can be manipulated independently of other breakpoints. For example, the individual breakpoint can be enabled, disabled, and removed through selection of various buttons, as shown here generally through buttons 410. While illustrated here as being configurable through buttons 410, it is to be appreciated and understood that any suitable mechanism can be used without departing from the spirit of the claimed subject matter.

In some embodiments, a command can be associated with the breakpoint. Alternately or additionally, a combination of commands can be associated with the breakpoint. Any suitable command can be associated with the breakpoint, such as a debugger command to display a current call stack when hitting the breakpoint, a debugger command to display register values, and the like. A breakpoint can be selected and, upon selection, be associated with the command, such as through entering the command in field 412. In some embodiments, the command can be executed upon code execution reaching a point in the code associated with the breakpoint, also known as "hitting the breakpoint". Alternately or additionally, a condition can be associated with the breakpoint, such as through entering the condition in field 414. For example, the breakpoint can be selected and, upon selection, be configured to conditionally halt code execution based upon the results of statement and/or test condition. Any suitable type of statement can be entered into field 412, such as "var1=true", "i1=0xffff", and the like.

Figure 5:
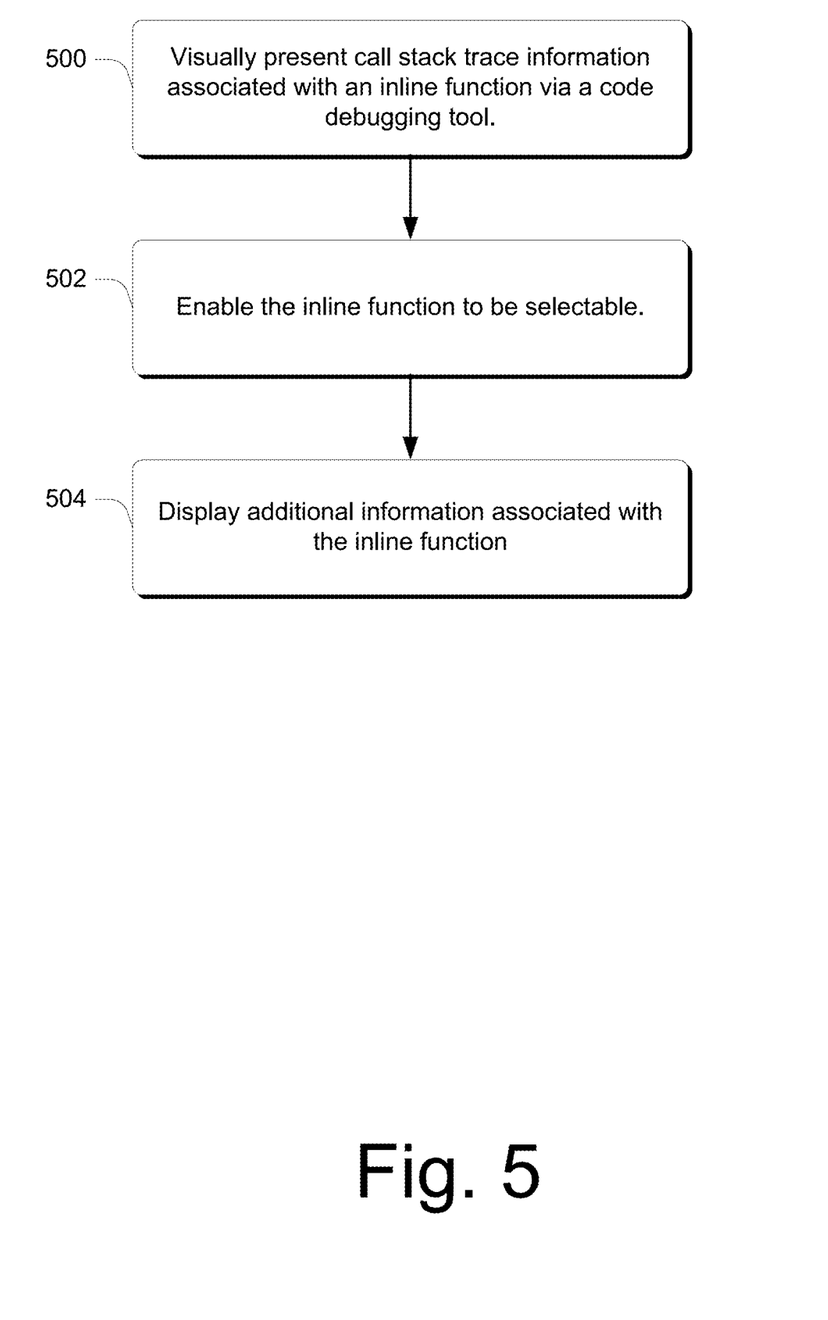
FIG. 5 is a flow diagram that describes steps in a method in accordance with one or more embodiments.

FIG. 5 is a flow diagram that describes steps in a method in accordance with one or more embodiments. The method can be performed by any suitable hardware, software, firmware, or combination thereof. In at least some embodiments, aspects of the method are performed by suitably configured software executing on a computing device such as inline debugging module 112 of FIG. 1.

Step 500 visually presents call stack trace information associated with an inline function via a code debugging tool. Examples of how this can be done are described above. In some embodiments, the code debugging tool can be configured to display call relationship information associated with the inline function. For example, the inline function can be displayed as an associated function name, and the call stack trace can be further configured to display function names associated with callers of the inline function. In some embodiments, the code debugging tool can be configured to incorporate virtual frame information associated with the inline function.

Step 502 enables the inline function to be selectable. Any suitable mechanism can be used to enable selection of the inline function, examples of which are provided above. Responsive to selection of the inline function, step 504 displays additional information associated with the inline function. For example, the additional information can comprise local variable information, an enumeration of multiple or all calls to the inline function, currently enabled breakpoints associated with the inline function, and the like.

Having considered debugging tool support for inline functions, consider now a discussion of program database support for inline functions in accordance with one or more embodiments.

Program Database Support for Inline Functions

When compiling source code, a compiler generates an executable output. In addition to generating the executable output, the compiler can also generate information that can be used to enable debugging of the executable output. Symbols, addresses, names of files and functions, frame information, as well as other forms of information, can be generated and stored during compile time for future use. For instance, information can be stored in a file that is accessible to a code debugging tool. The code debugging tool can be configured to access and process the stored information. Alternately or additionally, the code debugging tool can be configured to use the information to help relate execution of code to one or more source code files from which the executing code was generated. However, when compiling an inline function, this information can get lost and/or is simply is not generated due to the inline expansion. As a consequence, when the code debugging tool accesses the stored information, a discontinuity in information between inline functions and functions can arise.

In some embodiments, a compiler can be configured to generate information associated with debugging an inline function. The information can be stored in combination with debugging information associated with traditional, or non-inline, functions. The compiler can be further configured to introduce new information associated with the inline function to distinguish between the inline and non-inline functions. Alternately or additionally, a code debugging tool can be configured to process the information associated with debugging the inline function. In some embodiments, the compiler can generate a data structure associated with debugging inline functions.

Consider now a function frame and its role in the overall process described herein. Function frames in a call stack trace are used, for among other things, to help identify subroutine state information. Thus, when a first function calls a second function (such as a subroutine), each has its own associated frame information that can be pushed onto the call stack. During compile time, an inline function gets expanded inline within the calling function. Consequently, the inline function effectively becomes a part of the calling function and its associated frame. In some embodiments, a virtual frame can be associated with the inline function. While the inline function resides in a frame context of its calling function, the virtual frame can be assigned to the inline function to help identify the inline function in a call stack trace. In some embodiments, a data structure can be introduced to further distinguish between the virtual inline function frame and the associated frame of the calling function. For example, a data structure can be added to frame information associated with inline and/or non-inline functions. The data structure can be processed to determine the associated type of function and, consequently, frame information to be presented.

Figure 6:
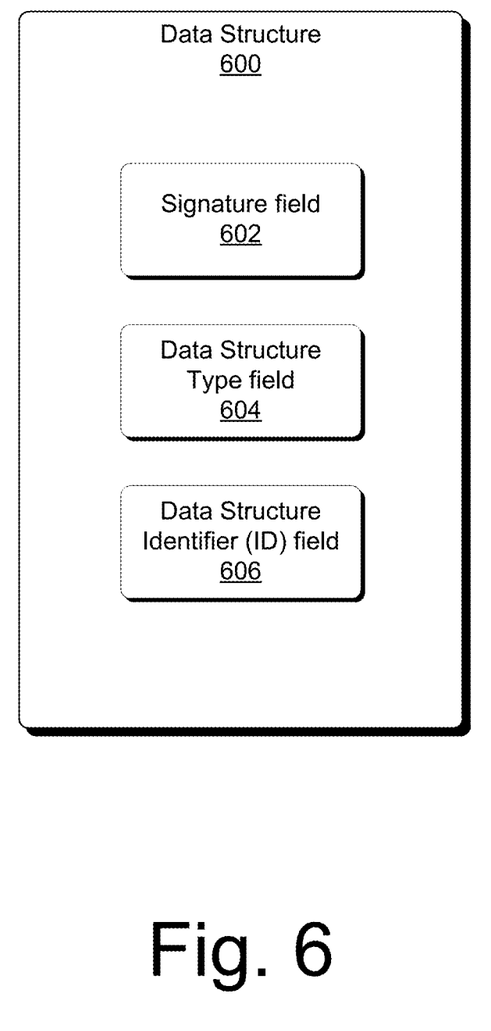
FIG. 6 illustrates an example data structure in accordance with one or more embodiments.

As an example, consider FIG. 6, which illustrates an example data structure in accordance with one or more embodiments. Data structure 600 includes a signature field 602, a data structure type field 604, and a data structure identifier field 606. Data structure 600 can be stored in any suitable way and, in some embodiments, can be stored in a PDB file.

Signature field 602 represents a signature that can be used to verify and/or protect data structure field 600 from being tampered with. In some embodiments, signature field 602 can be a dynamically-generated signature. For instance, a compiler can dynamically generate signature field 602 at compile time.

Data structure type field 604 represents a type used to identify whether the data structure is associated with a virtual inline frame or a stack frame, as will be further described below. In some embodiments, this field can be configured as a flag.

Data structure identifier (ID) 606 represents an ID that can be used to identify which virtual inline frame is being accessed and/or processed. For example, in some embodiments, data structure ID 606 can be a 0-based ID that can be used to track an inline function chain. Consider an example where inline_function1( ) calls inline_function2( ), which calls inline_function3( ). In this particular scenario, data structure ID 606 can be used to distinguish between the three inline functions in the calling chain, where inline_function1( ) may be associated with an ID value of "0", inline_function2( ) associated with an ID value of "1", and inline_function3( ) associated with an ID value of "2". The ID value can be used to not only distinguish between several inline functions in a call chain, but also to track a calling order.

Data structure 600 can be used in conjunction with a code debugging tool to provide a unified debugging experience between traditional functions and inline functions. The code debugging tool can be configured to access and process the data structure in order to make decisions related to what type of information can be presented to a user. In some embodiments, the data structure can be associated with collecting initial context information. For instance, an "Init" data structure can direct or trigger the code debugging tool to drill down to an inner-most inline frame associated with a current instruction pointer when possible. In other embodiments, the data structure can direct the code debugging tool to ignore all inline function frames. This scenario results in the code debugging tool behaving in a way that matches that of old code debugging tools, or legacy tools, where inline functions appear to not be supported.

Figure 7:
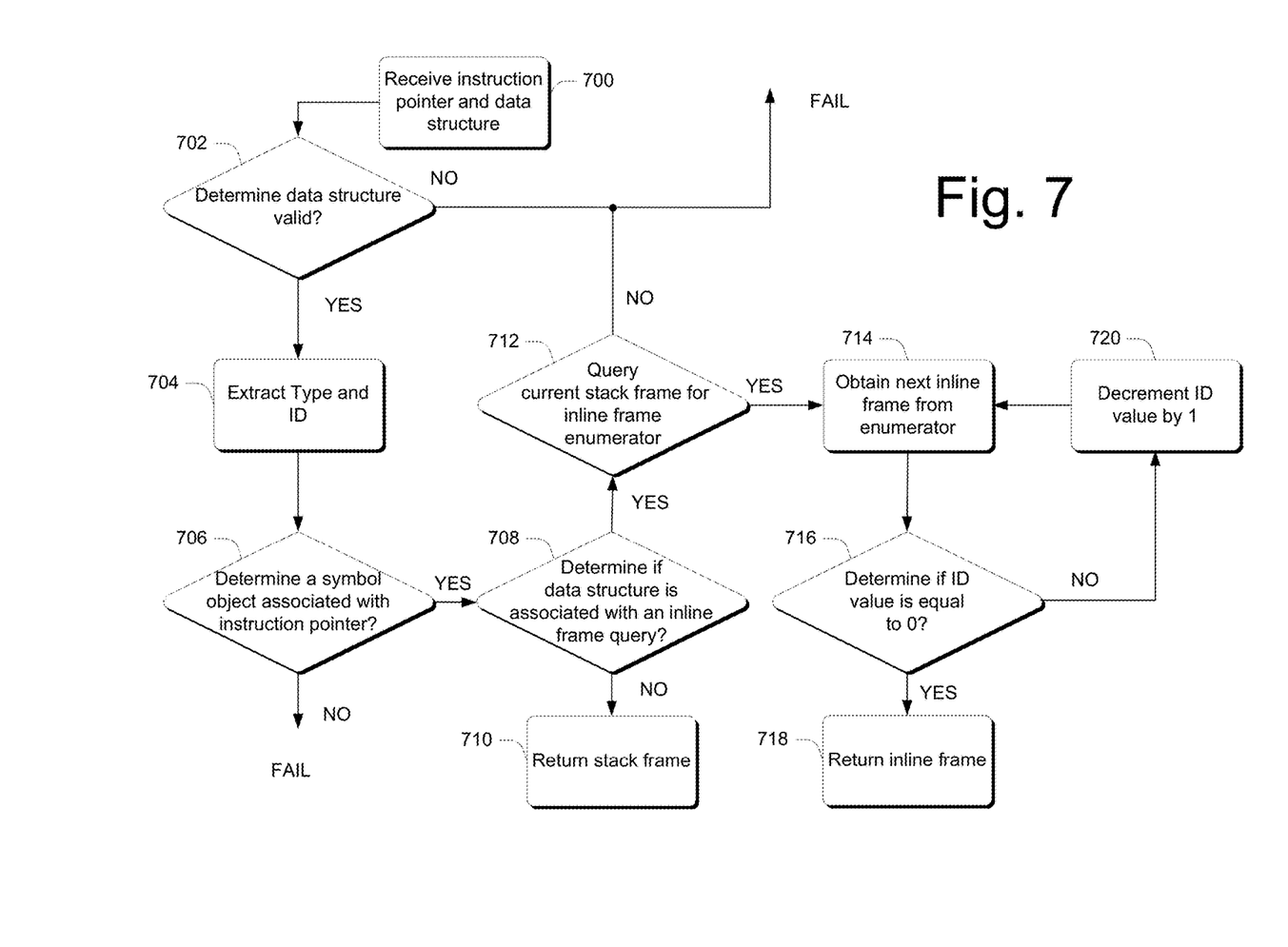
FIG. 7 is a flow diagram that describes steps in a method in accordance with one or more embodiments.

FIG. 7 is a flow diagram that describes steps in a method, in accordance with one or more embodiments, in which a virtual frame associated with an inline function can be identified and returned. The method can be performed by any suitable hardware, software, firmware, or combination thereof. In at least some embodiments, aspects of the method are performed by suitably configured software executing on a computing device such as inline debugging module 112 of FIG. 1.

Step 700 receives an instruction pointer and a data structure. In some embodiments, this can be received through processing a PDB file. Responsive to receiving the instruction pointer and data structure, step 702 determines if the data structure is valid, such as through verifying the signature as described above. If the data structure is determined to be invalid, the process fails. If the data structure is determined to be valid, step 704 extracts the type and ID associated with the data structure.

Step 706 determines whether a symbol object is associated with the instruction pointer. In some embodiments, the address associated with the instruction pointer can be used to look up symbol object information. Symbol objects can be used to provide various types of information, such as name, address, and type information associated with each identifiable object. If no symbol object is found, the process fails. However, responsive to determining that there is a symbol object, step 708 determines if the type is associated with an inline frame query.

Responsive to determining the type is not associated with an inline frame query, step 710 returns a stack frame. However, responsive to determining the type is associated with an inline frame query, step 712 queries the current stack frame for an inline frame enumerator. If this is not successful, the process fails. However, if the query is successful, step 714 obtains the next inline frame from the enumerator. Responsive to obtaining the next inline frame from the enumerator, step 716 determines if the associated ID value is equal to "0". If it is, step 718 returns the inline frame. If it is not, step 720 decrements the ID value by "1". The process then returns to steps 714, 716, and 720 and repeats itself until the ID with a value of "0" is located and returned. In this manner, a virtual frame associated with an inline function can be identified and returned.

Having discussed program database support for inline functions, consider now a discussion of an example system in accordance with one or more embodiments.

Example System

Figure 8:
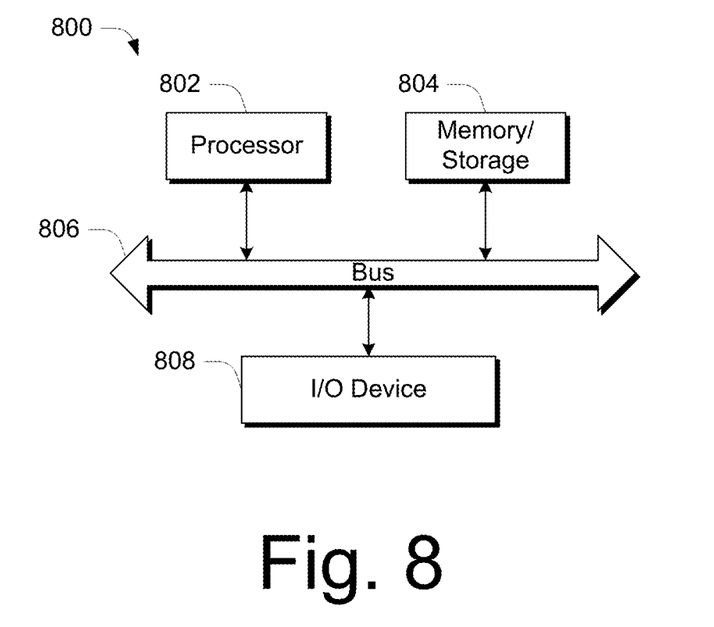
FIG. 8 illustrates an example system that can be utilized to implement one or more embodiments.

FIG. 8 illustrates an example computing device 800 that can be used to implement the various embodiments described above. Computing device 800 can be, for example, computing device 102 of FIG. 1 or any other suitable computing device.

Computing device 800 includes one or more processors or processing units 802, one or more memory and/or storage components 804, one or more input/output (I/O) devices 806, and a bus 808 that allows the various components and devices to communicate with one another. Bus 808 represents one or more of any of several types of bus structures, including a memory bus or memory controller, a peripheral bus, an accelerated graphics port, and a processor or local bus using any of a variety of bus architectures. Bus 808 can include wired and/or wireless buses.

Memory/storage component 804 represents one or more computer storage media. Component 804 can include volatile media (such as random access memory (RAM)) and/or nonvolatile media (such as read only memory (ROM), Flash memory, optical disks, magnetic disks, and so forth). Component 804 can include fixed media (e.g., RAM, ROM, a fixed hard drive, etc.) as well as removable media (e.g., a Flash memory drive, a removable hard drive, an optical disk, and so forth).

One or more input/output devices 806 allow a user to enter commands and information to computing device 800, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer Conclusion Various embodiments provide an ability to present content associated with an inline function via a code debugging tool. In some embodiments, the code debugging tool can be configured to enable manipulation of commands associated with the inline function. Alternately or additionally, one or more calls to the inline function can be manipulated independently from each other within the debugging tool.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
visually presenting call stack trace information associated with an inline function, via a code debugging tool, the call stack trace information having a representation for the inline function in a same manner as a representation for a non-inline function;
responsive to visually presenting the call stack trace information, enabling the representation of the inline function to be selectable; and
responsive to selection of the representation of the inline function, displaying a calling context of the inline function, the calling context comprising an enumeration of multiple caller functions having called the inline function and enabling breakpoints to be set on the multiple caller functions to the inline function individually.

2. The computer-implemented method of claim 1, further comprising displaying the calling context in a window independent from a window visually presenting the call stack trace information.

3. The computer-implemented method of claim 1 further comprising:
responsive to selection of the representation of the inline function, enabling breakpoints to be set on multiple calls to the inline function as one or more of a group.

4. The computer-implemented method of claim 3 further comprising:
responsive to selection of the representation of the inline function, enabling at least one breakpoint to conditionally halt code execution on a call to the inline function.

5. The computer-implemented method of claim 1, the call stack trace information being associated with optimized executable code.

6. The computer-implemented method of claim 1, further comprising: responsive to selection of the representation of the inline function, displaying additional information associated with the inline function, the additional information comprising at least one local variable and value associated with the inline function.

7. The computer-implemented method of claim 1, the call stack trace information being presented at a level higher than assembly level instructions.

8. The computer-implemented method of claim 1, wherein the representation of the inline function comprises a virtual frame.

9. The computer-implemented method of claim 1, wherein the representation of the inline function comprises a name, a signature or an identifier associated with the inline function.

10. The computer-implemented method of claim 1, further comprising:
    responsive to selection of the representation of the inline function, displaying one or more local variables associated with the inline function.

11. The computer-implemented method of claim 10, further comprising:
    altering a value of at least one of the one or more local variables.

12. The computer-implemented method of claim 11, further comprising:
    updating code associated with the inline function to reflect the altered value.

13. A system, comprising:
    at least one processor and a memory;
    the at least one processor configured to perform actions that:
    display call stack trace information in a debugger, the displayed call stack trace information including a representation of an inline function in a same manner as a representation of a non-inline function;
    responsive to the display of the call stack trace information, enable the representation of the inline function to be selected; and
    responsive to selection of the representation of the inline function, display a calling context of the inline function, the calling context comprising an enumeration of multiple caller functions having called the inline function and enabling breakpoints to be set on the multiple caller functions to the inline function individually.

14. The system of claim 13, wherein the at least one processor is further configured to:
    display the calling context in a window independent from a window displaying the call stack trace information.

15. The system of claim 13, wherein the at least one processor is further configured to:
    responsive to selection of the representation of the inline function, enable at least one breakpoint to be set on multiple calls to the inline function as one or more of a group.

16. The system of claim 13, wherein the at least one processor is further configured to:
    responsive to selection of the representation of the inline function, enable at least one breakpoint to conditionally halt code execution on a call to the inline function.

17. The system of claim 13, wherein the representation of the inline function comprises a name, a virtual frame, signature or identifier associated with the inline function.

18. The system of claim 13, wherein the at least one processor is further configured to:
    alter a value of a local variable of the inline function.

19. The system of claim 18, wherein the at least one processor is further configured to:
    update code associated with the inline function to reflect the altered value.

20. The system of claim 13, wherein the at least one processor is further configured to:
    responsive to selection of the representation of the inline function, display one or more local variables associated with the inline function.

\* \* \* \* \*